United States Patent [19]

Ohmura et al.

[11] Patent Number: 5,189,952
[45] Date of Patent: Mar. 2, 1993

[54] PROCESS FOR PRODUCING WINDOW GLASS WITH THIN FILM THEREON

[75] Inventors: Shinya Ohmura, Tokyo; Hisakazu Tsuchiya, Yokohama; Masahiro Miwa, Tokyo, all of Japan

[73] Assignee: Asahi Glass Company, Ltd., Tokyo, Japan

[21] Appl. No.: 666,885

[22] Filed: Mar. 8, 1991

[30] Foreign Application Priority Data

| Mar. 9, 1990 [JP] | Japan | 2-56746 |
| Mar. 9, 1990 [JP] | Japan | 2-56747 |
| Oct. 30, 1990 [JP] | Japan | 2-290667 |
| Oct. 30, 1990 [JP] | Japan | 2-290670 |

[51] Int. Cl.$^5$ .................. B41M 1/04; B41M 7/00
[52] U.S. Cl. .................. 101/211; 101/488; 101/491; 65/60.2; 427/266; 427/380; 430/432
[58] Field of Search .............. 101/211, 487, 488, 491; 427/266, 269, 287, 380, 379, 372.2; 65/60.1, 60.2; 430/432

[56] References Cited

U.S. PATENT DOCUMENTS

| 3,762,902 | 10/1973 | Wagner et al. | 65/104 X |
| 3,973,058 | 8/1976 | Grover et al. | 427/163 |
| 4,203,751 | 5/1980 | Roth et al. | 65/106 |

Primary Examiner—Clifford D. Crowder
Attorney, Agent, or Firm—Oblon, Spivak, McClelland, Maier & Neustadt

[57] ABSTRACT

A process for producing a window glass with a thin film thereon, which comprises coating a coating solution on a glass substrate by flexographic printing and then baking the coated glass substrate to form a thin film.

19 Claims, 13 Drawing Sheets

PROCESS FOR PRODUCING WINDOW GLASS WITH THIN FILM THEREON

BACKGROUND OF THE INVENTION

1. Field of the Invention

The present invention relates to a process for producing a window glass with a thin film thereon.

2. Description of the Prior Art

Conventional methods for forming a thin film on a substrate include a spraying method on a substrate at a high temperature, and dip-coating, spin-coating and roll-coating methods on a substrate at room temperature, and the like. However, any of these conventional methods required to use a large amount of coating solution, which resulted in a high cost. Other methods such as vacuum vapor deposition and sputtering methods required a high apparatus cost and were poor in productivity.

Also, in the case of forming a thin film on only a part of a glass substrate, physical vapor deposition methods such as a vacuum deposition method and a sputtering method required masking on the substrate, which resulted in a high manufacturing cost and a poor productivity.

On the other hand, as a method without using a mask, a screen-printing method is enumerated. However, when a relatively large area of a glass substrate is printed, the screen-printing method is not preferable in the following respects.

That is, as shown in FIG. 16(a), in the case of the normal state of the screen-printing, a glass substrate 1 on a table 23 and a screen 20 supported by a screen frame 21 come in contact with each other under the force of a squeezer 22 in a straight line where an ink 24 oozes though the screen 20 and is printed on the glass substrate 1. However, in the case of printing a film of a large area, as shown in FIG. 16(b), the screen 20 is not clearly separated from the glass substrate 1 on the printing part even after the squeezer 22 passes, and when the the screen 20 is abruptly separated from the glass substrate 1 after printing, the printed pattern thus obtained becomes deformed and uneven. The printed pattern thus obtained forms an uneven film when the ink is dried or baked. When printing a ceramic color ink on the periphery of a glass substrate or when printing a paste for fine electroconductive print, the above mentioned troubles do not arise, but when printing a large area, the trouble as shown in FIG. 16(b) is caused. Also, in the screen-printing, the viscosity of an ink must be increased so as not to flow downwards. In order to increase the viscosity of the ink, the content of an organic material having a large molecular weight must be increased. Such a screen-printed layer containing the above mentioned organic material does not form a satisfactory film because gasses such as carbonic acid gas, water or $N_2$ are evolved during baking. In other words, the thin film thus obtained becomes porous and therefore poor in wear resistance and chemical resistance, and is consequently unusable.

SUMMARY OF THE INVENTION

An object of the present invention is to overcome the above mentioned disadvantages of the prior arts and to provide a process for producing a window glass with a thin film thereon, which comprises coating a coating solution on a glass substrate by flexographic printing and then baking the coated glass substrate to form a thin film.

DETAILED DESCRIPTION OF THE INVENTION

The essential future of the present invention resides in that a coating solution is coated on a glass substrate by flexographic printing.

Figure 1:
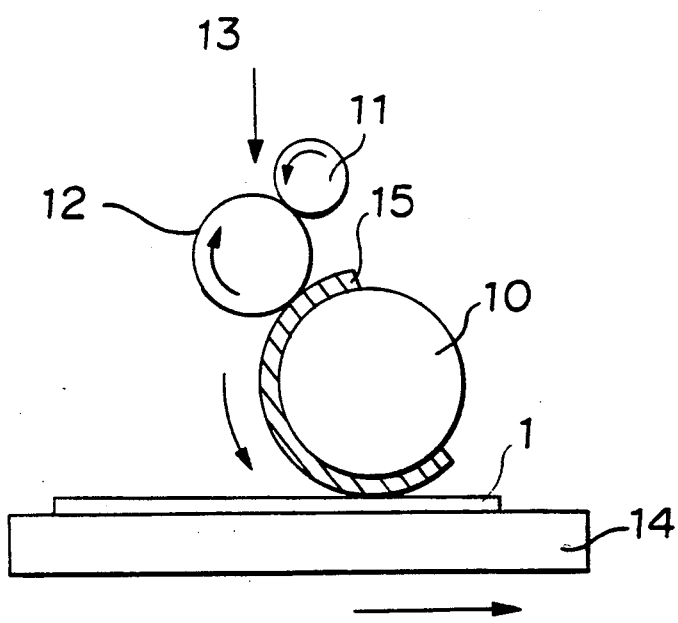
FIG. 1 is a sectional view illustrating an example of a flat-bed flexographic printing machine used in the present invention.

The term, "flexographic printing" used in the present invention means rotary letterpress printing using a plate cylinder (flexographic plate) made of an elastic material such as rubber, plastic or the like. FIG. 1 is a sectional view illustrating an example of a flat-bed flexographic printing machine used in the present invention. In the flexographic printing, a coating solution 13 is uniformly supplied on a flexography plate 15 wound around a plate cylinder 10 by rotating a doctor roll (rubber roll) 11 and an anilox roll (ceramics roll) 12, and is then coated on a glass substrate 1 from the flexography plate 15 in accordance with the movement of the glass substrate 1 on a table 14 along the rotation of the plate cylinder 10. As can be seen from FIG. 1, it is possible for the flexographic printing to continuously print a large area uniformly because the printing is carried out always by line contact between the glass substrate 1 and the flexography plate 15 (rubber letterpress printing plate) wound around the plate cylinder 10.

As compared with screen-printing, in case of the flexographic printing, an ink having a low viscosity (about 20 to 120 cps at 25° C.) can be suitably used, and the time required for leveling (the time taken until the surface of the coated ink becomes evenly uniform) is shorter. Also, in the flexographic printing, it is not necessary to use an ink containing an organic material of a large molecular weight, and a solvent substantially evaporatable at room temperature can be used as a solvent for the ink. Therefore, the weight change during the baking of a flexographically coated film is small and the film does not become porous.

In the present invention, examples of a glass substrate 1 on which a thin film is formed, include a soda lime glass plate, a heat ray-absorbing glass plate, a colored glass plate and the like, but are not specially limited thereto.

After flexographically printing a coating solution 13, it is preferable to bake the printed film. The baking removes a solvent and makes the film denser. The baking also improves a film quality and increases an adhering strength to a glass substrate. Simultaneously with the baking, the glass substrate may be subjected to bending and tempering. According to this procedure, the productivity is greatly improved and there is an advantage that cracks hardly occur during bending.

Examples of a thin film 2 produced by the present invention include a heat ray-reflective film, a solar control film, an electromagnetic wave-shielding film, an electromagnetic wave-transmitting film, an electroconductive film for transparent glass antenna, a reflective film for head-up display combiner, a colored film for sunshade in window, and the like.

In the present invention, when a coating solution which can be gelled by light is used as the coating solution 13, the flexographically printed coating becomes inadhesive to dusts after exposing to light (irradiation with light), and provides a thin film of good quality at a high productivity. Heretofore, a printed film is generally dried so as not to be adhesive to dusts, but according to this case of the present invention, a drying apparatus and time can be omitted and replaced simply by irradiating with light for about 10 seconds to 10 minutes. Thus, the succeeding baking, bending and tempering steps can be smoothly conducted at a high productivity.

Exposing to light is preferably conducted by irradiating UV ray from a low pressure-mercury lamp, a high pressure-mercury lamp, a metal halide lamp or the like. It is preferable to irradiate light directly on a flexographically printed coating. When light is irradiated through a glass substrate, a part of light (particularly UV ray) is absorbed by the glass substrate and accordingly the effect of the light-irradiation is not satisfactory.

A coating solution gellable by light preferably contains a chelating agent and a metal alkoxide gellable by light in the presence of the chelating agent. Examples of the metal alkoxide include a titanium alkoxide, an indium alkoxide, a tantalum alkoxide, a zirconium alkoxide, a boron alkoxide, a silicon alkoxide and a mixture thereof.

As the titanium alkoxide, any titanium alkoxide may be used, provided that it is gellable in the presence of a chelating agent by irradiation with light and that it can be baked to form $TiO_2$. Typical examples of the titanium alkoxide include a tatraalkyl titanate and its oligomer, having the following chemical formula (I) such as titanium octylene glycolate (TOG), tetrabutyl titanate (TBT), tetraethyl titanate, tetraisopropyl titanate, dimethyldipentyl titanate and the like.

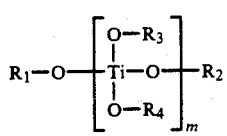

(I)

(wherein each of $R_1$, $R_2$, $R_3$ and $R_4$ represents a $C_{1-10}$ alkyl group and m represents a natural number of preferably not more than 10.)

Further, the above compound, the alkoxy group of which is replaced by an alkyl group, for example, an alkyl trialkoxy titanium and the like, may also be used.

As the indium alkoxide, any indium alkoxide may be used, provided that it is gellable in the presence of a chelating agent by irradiation with light and that it can be baked to form $In_2O_3$. Typical examples of the indium alkoxide include a trialkoxy indium and its oligomer.

As the zirconium alkoxide, any zirconium alkoxide may be used, provided that it is gellable in the present of a chelating agent by irradiation with light and that can be baked to form $ZrO_2$. Typical examples of the ziconium alkoxide include a tetraalkoxy zirconium and its oligomer. In addition, an alkyl trialkoxy zirconium and the like may also be used.

As the silicon alkoxide, any silicon alkoxide may be used, provided that it can be gellable in the presence of a chelating agent by irradiation with light and that it can be baked to form $SiO_2$. Typical examples of the silicon alkoxide include a tetraalkoxy silane and its oligomer as expressed by the following chemical formula (II), for example, tetraethyl silicate, tetrabutyl silicate and the like.

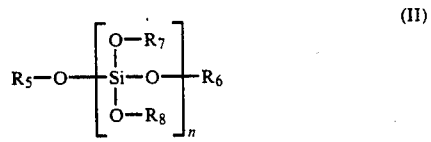

(II)

(wherein each of $R_5$, $R_6$, $R_7$ and $R_8$ represents a $C_{1-10}$ alkyl group and n represents a natural number of preferably not more than 10.)

Further, the above compound, the alkoxy group of which is replaced by an alkyl group, such as an alkyl trialkoxy silane and the like, may also be used.

As the tantalum alkoxide, any tantalum alkoxide may be used, provided that it is gellable in the presence of a chelating agent by irradiation with light and that it can be baked to form $Ta_2O_5$. Typical examples of the tantalum alkoxide include a pentaalkoxy tantalum and its oligomer. In addition, an alkyl tetraalkoxy tantalum and the like may also be used.

As the boron alkoxide, any boron alkoxide may be used, provided that it is gellable in the presence of a chelating agent by irradiation with light and that it can be baked to form boron oxide. Typical examples of the boron alkoxide include trimethoxy boron, triethoxy boron, tri-i-propoxy boron, tri-n-propoxy boron, tri-i-butoxy boron, tri-n-butoxy boron, tri-sec-butoxy boron, tri-t-butoxy boron and the like.

As the tin alkoxide, any tin alkoxide may be used, provided that it is gellable in the presence of a chelating agent by irradiation with light and that it can be baked to form $SnO_2$. Typical examples of the tin alkoxide include a tetraalkoxy tin and its oligomer. In addition, an alkyl trialkoxy tin may also be used.

The kinds and the mixing ratio of these alkoxides of titanium, indium, zirconium, tantalum, boron, silicon, and tin are selected by considering such factors as an optical refractive index and color-developing property, and mechanical wear resistance, chemical resistance and the like.

Among these compounds, a titanium alkoxide and a silicon alkoxide are preferable since they are easily available. In this case, a refractive index becomes high when a titanium alkoxide is used in a larger amount, and becomes low when a silicon alkoxide is used in a larger amount. Also, a boron alkoxide is useful for lowering a refractive index.

When a coating solution contains a coloring agent, a titanium alkoxide is excellent in color-developing property. In order to enhance color-developing property in a lower refractive index zone, ethyl silicate (monomer) is preferable, but ethyl silicate 40 (ethyl silicate tetramer) is not so preferable.

In order to improve wear resistance in a high refractive index zone, tetrapropoxide titanate and tetrabutyl titanate (TBT) are preferable, but titanium octylene glycolate (TOG) is relatively less effective. However, in a lower refractive index zone, both ethyl silicate 40 (tetramer) and ethyl silicate (monomer) are excellent and there is no substantial difference between the two.

Metal alkoxides other than mentioned above may also be used, provided that they are gellable in the presence of a chelating agent by irradiation with light, and metal alkoxides, the alkoxy group of which is partly replaced by an alkyl group, may also be used.

The above mentioned compounds provide also a satisfactory chemical resistance, but the chemical resistance depends on the mixing ratio of a chelating agent and a catalyst mentioned below.

Examples of a chelating agent contained in a coating solution gellable by light, generally include ketones, the typical example of which includes acetyl acetone.

For examples, at most 4 oxygen atoms of ketone can be coordinated with one titanium atom of a titanium alkoxide, and accordingly it is ideal to coordinate 4 oxygen atoms of ketone with one titanium atom. However, since a tetraalkoxy silane and a coloring agent are also used in a mixture therewith, a ketone may be used in such an amount as to provide from 1.5 to 10 oxygen atoms for one titanium atom.

For example in the combination of tetrabutyl titanate and acetyl acetone, from about 0.8 to 5 mols of acetyl acetone may be used in a mixture with 1 mol of tetrabutyl titanate since a acetyl acetone has 2 ketone groups.

Any solvent may be used for preparing a coating solution gellable by light, provided that it dissolves the above mentioned metal alkoxides, chelating agents and the like. Examples of the solvent include alcohol type, glycol type, Cellosolve type, Carbitol type solvents and the like.

The above mentioned metal alkoxides are hydrolyzed by water content in a solvent, and are dehydration-condensed, polymelyzed and gelled by drying. It is considered that these reactions are rapidly accelerated by a chelating agent and light.

In the present invention, it is preferable to add a catalyst necessary for accelerating these reactions in a coating solution. Examples of the catalyst include nitric acid, acetic acid, hydrochloric acid, sulfonic acid and the like, but are not limited thereto.

When a coloring agent described below is contained in a coating solution, among the above catalysts, hydrochloric acid is most effective for color-development, and the visible transmittance (Tv) of the colored thin film produced by using the same becomes lowered. This tendency is common with regard to all the other coloring agents used in the present invention. For example, Tv difference becomes from 3 to 5% when a colored thin film having a Tv value of about 70% is applied to a glass substrate (Tv=91%) of 2 mm thickness.

According to the present invention, a colored thin film 2 can be formed by using a coating solution 13 having a coloring agent added. Examples of the coloring agent contained in the coating solution 13 to color the thin film include at least one of paradium, gold, platinum, rhodium, ruthenium, nickel, cobalt, iron, and a compound thereof. These materials are considered to be dispersed in the form of metal colloid or compound such as oxide in the thin film 2. These coloring agents are suitably used in the form of chlorides such as paradium chloride, chloroauric acid, rhodium chloride and the like, but any other stable and soluble compound can also be used. When nickel, cobalt and iron are used, they are added to the coating solution preferably as nitrates.

According to the present invention, a coating solution 13 is coated on a glass substrate 1 by flexographic printing, and therefore if a flexographic letterpress printing plate 15 having patterns is used, the coating solution 13 is coated automatically in patterns, thereby forming a thin film having patterns.

On the other hand, as mentioned above, since the flexographic printing enables satisfactory solid evenly uniform printing in a large area, a thin film having patterns formed can be provided by coating a large area of a glass substrate with a coating solution gellable by light by flexographic printing, partially masking the coated area to produce patterns, exposing to light and developing. Also, it is possible to provide a multi-layered film having patterns by conducting flexographic printing for plural times, then exposing the multi-layered printed film to light and developing.

The steps of forming a thin film having patterns are explained hereinafter.

The above coating solution gellable by light is coated on a substrate by flexographic printing to form a printed layer. Thereafter, it is generally preferable to have the printed layer dried by heating or slightly exposing to light to such a degree as to be substantially inadhesive. This drying treatment prevents the layer from adhering to a mask to be used in the succeeding step, and enables to form precise patterns with high accuracy by making the distance between the mask and the substrate smaller.

The printed layer thus treated is partly exposed to light (or partly irradiated with light) by using a mask. By the irradiation with light, the compounds in the part irradiated with light are gelled to produce bondings such as Si—O—Si, Ti—O—Ti or the like. Thus, the solubility of the printed layer becomes different between the part exposed to light and the part unexposed to light.

Thereafter, the substrate thus treated is subjected to development with an alcohol, an alkaline aqueous solution or water, thereby removing the unexposed part to form a desired pattern. The substrate having the patterned layer thus formed can be packed in a pallet together with paper, and has such a satisfactory strength as to be durable for transporting a long distance by truck, cutting, chamfering, washing and the like. Thus, a rational production line can be composed.

Further, it is preferable to heat and bake the printed and patterned layer. The baking removes a solvent to produce a dense film, thereby improving the film quality and the adhesive strength between the glass substrate and the film. Bending and tempering steps may be carried out at the same time during the baking step.

In the present invention, it is also possible to form a thin film having patterns by printing a coating solution gellable by light in patterns using a patterned flexography plate as mentioned above, and exposing the whole part to light. For example, the above mentioned coating solution is coated on a substrate by a flexographic printing machine to form a patterned printed layer, and is exposed to light and, if desired, further dried.

The light (UV) irradiation time and the heating time are determined by considering the aimed properties of a thin film to be formed, but it is generally preferable to conduct the light (UV) irradiation for from 10 seconds to 10 minutes and the heating treatment at from 120° to 680° C. for from 3 to 60 minutes.

Also, the light (UV) irradiation sometimes improves the chemical resistance of a colored thin film, particularly of a Pt type or Pd type film.

As mentioned above, a colored thin film having a desired transmissive color and a desired reflective color can be easily produced.

The thickness of the film is determined depending on the aimed properties, but is generally in the range of from 100 Å to 2,000 Å. It is difficult to produce a uniform film less than 100 Å. On the other hand, if the thickness of the film exceeds 2,000 Å, cracks easily occur on the surface of the film during production. If a thicker film is desired, a plurality of thin films may be overlaid. A deep colored substrate can be produced by forming a colored thin film on the opposite side of the substrate.

The examples of compositions of various colored thin films are explained hereinafter.

The preferable composition of a colored thin film is, for example, $TiO_2$ 5-95 wt %, $SiO_2$ 0-90 wt % and Pd 5-75 wt % (conversion value in terms of PdO). The visible transmissive light has the main wavelength in the vicinity of 577 nm of yellow. The visible light transmittance Tv varies in the range of from 86 to 45% depending on the concentration of Pd and the ratio of $TiO_2$ and $SiO_2$. (The glass substrate is white and has a thickness of 2 mm and a visible light transmittance Tv of 90.5%. All the glass substrates used hereafter are the same as this.)

The visible reflective light has the main wavelength value close to that of the transmissive light, and is yellowish. The visible light reflectance Rv varies in the range of from 9% to 38% depending on the composition. A higher reflectance is obtained according as the ratio of $TiO_2/SiO_2$ and the PdO content become higher. This tendency is common also with regard to the other coloring agents mentioned hereinafter.

The thickness of a colored thin film is controlled by the weight percentage of oxides and coloring agent metals or coloring agent metal oxides in the coating solution (hereinafter referred to as a solid content concentration, in this case,

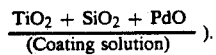

$$\frac{TiO_2 + SiO_2 + PdO}{(Coating\ solution)}).$$

In the composition of this system, a suitable solid content concentration is from 3.5 to 8.85%, and is controlled only by the amount of a solvent, without changing the amounts of a chelating agent and a catalyst. This tendency is common also with regard to the other coloring agents mentioned below.

If the thickness of a colored thin film exceeds about 900 Å, abrasion resistance becomes poor. The abrasion resistance is measured by taper wearing test {wearing wheel, CS-10F, load 500 g, 100 round wear}, and the standard mark is determined as the variation of haze $\Delta H = 1.0\%$ or less. The abrasion resistance is regarded to be acceptable when a sample satisfies the above standard mark. This tendency is common also with regard to the other coloring agents mentioned below.

On the other hand, the thickness of a colored thin film is less than about 150 Å, chemical resistance becomes poor. The chemical resistance is measured by dipping a sample in 1N-$H_2SO_4$ at room temperature for 48 hours, and the standard mark (A) is determined as the variation of $\Delta Tv$ (the difference of the visible light transmittance before and after dipping) = 1% or less when the initial visible light transmittance Tvo is 65% or above, and as the variation of $\Delta Tv = 2\%$ or less when the initial visible light transmittance Tvo is 65% or below. Also, the chemical resistance is measured by dipping a sample in 1N-NaOH at room temperature for 48 hours, and the standard mark (B) is determined as $\Delta Tv = 1\%$ or less when Tvo is 65% or above, and as $\Delta Tv = 2\%$ or less when Tvo is 65% or below. The chemical resistance is regarded to be acceptable when the sample satisfies the above mentioned standard marks (A) and (B) at the same time. The above tendency is common also with regard to the colored thin films using the other coloring agents mentioned below.

The problems which arise when the concentration of a coloring agent in a colored thin film is increased, are explained hereinafter. For example, if $PdO/(TiO_2 + SiO_2 + PdO)$ exceeds 75%, $PdCl_2$ becomes hardly soluble in a coating solution and a solid material tends to precipitate out from the coating solution during preservation. Also, HCl is necessary to dissolve $PdCl_2$ in the coating solution. At least 2 parts by weight of HCl is used to 1 part by weight of $PdCl_2$, and the mixture of $PdCl_2$ and HCl should preferably be maintained being stirred at least for 15 minutes. On the other hand, if the PdO content is increased, the amounts of titanium alkoxide and silicon alkoxide are reduced and the ratio of a catalyst (HCl) to the alkoxides increases, thereby gelling the alkoxides before using as a coating solution. Therefore, it is difficult to make PdO contained in an amount of exceeding 75% in the colored thin film. $PdCl_2$ is hardly soluble in nitric acid, acetic acid and the like in place of HCl.

The thin film produced from coating solution containing $PdCl_2$ exhibits about 3% lower value in the vicinity of $Tv = 70\%$ when it is exposed to light and baked as compared with the value obtained when it is baked without exposing to light.

Another example of using Au as a coloring agent is explained hereinafter. The preferable composition of a colored thin film is, for example, $TiO_2$ 85-3 wt %, $SiO_2$ 40-0 wt % and Au 5-60 wt %. The transmissive visible light for this colored thin film has the main wavelength of from 490 to 430 nm in the blue to red purple zone. The visible light transmittance Tv is from 86 to 40%, and can be controlled by the film thickness, Au concentration and the ratio of $TiO_2:SiO_2$. The reflective visible light has the main wavelength of from 470 nm of blue to 620 nm of red, and 446 nm of red purple in some cases. The reflectance is about from 10 to 25%. This visible light reflective color has the complementary color relation with a visible light transmissive color, and varies depending on the ratio of $TiO_2$, $SiO_2$ and Au and thickness. Particularly, when the content of Au exceeds 20 wt %, the reflective light becomes remarkably reddish.

Generally, a film colored with Au can be improved in respect of abrasion resistance when 1 to 5 wt % of $P_2O_5$ is added in the form of $H_3PO_4$. This tendency is common also with regard to the other coloring agents.

The chemical resistance is within the above mentioned standard.

The colored thin film using Au as a coloring agent provides a visible transmissive light having the main wavelength of 421 nm of purple and also 660 nm of red when it is exposed to light and baked. Also, the color purity is low and a thin film having a color tone close to neutral color can be obtained.

Chloroauric acid used as a coloring material is deliquescent, and it is therefore convenient to use it in the form of a 20% hexylene glycol solution. There is no trouble when preparing a coating solution, and the solution thus prepared is stable during preservation and usable even after the preservation of 3 months at room temperature. However, this type of material should preferably be preserved in a cool and dark place.

In the case of using Au as a coloring agent, the above mentioned respective properties of the composition do not largely vary even by substituting $ZrO_2$ for $TiO_2$ and substituting $TiO_2$ for $SiO_2$ (i.e. the composition of $ZrO_2$ 85-3 wt %, $TiO_2$ 40-2 wt % and Au 5-60 wt %).

Now, the case where the mixture of Pd and Au is used as a coloring agent is explained hereinafter. The preferable composition, for example, is $TiO_2$ 5-95 wt %, $SiO_2$ 0-95 wt % and (Au+Pd) 5-80 wt % (Pd is calculated in terms of PdO), and the ratio of Au and Pd can be optionally selected. The respective properties are intermediate between those of the colored thin film containing Pd as a coloring agent and those of the colored thin film containing Au as a coloring agent. The optical properties are shown in the following Table 1.

TABLE 1

| Composition of colored thin film | $TiO_2$ | 24 wt % | 24 | 24 | 24 | 24 |
|---|---|---|---|---|---|---|
| | $SiO_2$ | 16 wt % | 16 | 16 | 16 | 16 |
| | Pd (in terms of PdO) | 50 wt % | 40 | 30 | 20 | 10 |
| | Au | 10 wt % | 20 | 30 | 40 | 50 |
| Solid content concentration of photosensitive material | | 6.5 wt % | 5 | 5 | 5 | 5 |
| Transmissive visible light | Transmittance | 54.4% | 57.0 | 63.6 | 57.2 | 51.7 |
| | Main wavelength | 578.3 nm | 577.8 | 576.4 | 576.9 | 573.5 |
| | Color purity | 13.6% | 10.0 | 6.4 | 5.7 | 2.2 |
| Reflective visible light | Reflectance | 30.2% | 23.3 | 17.9 | 20.4 | 20.2 |
| | Main wavelength | 547.7 nm | 487.3 | 482.4 | 485.5 | 558.7 |
| | Color purity | 2.7% | 3.5 | 5.9 | 2.0 | 2.0 |

The abrasion resistance varies depending on the ratio of Pd/Au, but the chemical resistance is stable. This type of coating solution is usable after at least 3 months' preservation if it is preserved in a cold and dark place. However, if it is preserved at room temperature, it becomes unusable in one month since yellow muddy precipitation occurs. If the content of (Au+Pd) exceeds 60% by weight, the stability becomes poor and it is necessary to use it within 7 days.

The case of using Pd as a coloring agent is explained hereinafter.

The preferable composition of a colored thin film is, for example, $TiO_2$ 3-90 wt %, $SiO_2$ 0-48 wt % and Pt 10-70 wt %.

The visible transmissive light has the main wavelength of around 575 nm of gray and Tv is about 32-85%. Rv is about 10-33%. The color purity of the reflective light is low and is liable to be neutral.

The case of using Pt as a coloring agent exhibits remarkable effects by exposing to light. In this case, the colored thin film exposed to light and baked exhibits a good color development and is excellent in respect of abrasion resistance and chemical resistance. Also, a uniform colored thin film can be obtained even when the contents of a chelating agent and a catalyst are increased in the coating solution. However, if the exposing step is omitted, all of the properties become poor and the colored thin film is peeled off like a flake in some case during baking. This tendency is remarkable when the Pt content in the colored thin film is high.

When the concentration of hexachloroplatinic acid used as a coloring material is increased, or when the platinum concentration in the colored thin film exceeds 60 wt %, the periphery of the film thus formed is swollen like a picture frame (the film thickness along the periphery of the film becomes locally thick and remarkably noticeable ). In order to prevent this phenomena, a small amount of a surface active agent may be used, and examples of the surface active agent include a silicon type or fluorine type surfactants. Phosphoric acid exhibits the same function.

Hexachloroplatinic acid used as a coloring material is deliquescent, and it is therefore convenient to use it as a 20% hexylene glycol solution. The coating solution has a good preservation stability, and is usable even after preserving for 3 months at room temperature. However, it is preferable to preserve it in a cold and dark place.

Au may be substituted for a part of Pt. That is, the composition of $TiO_2$ 3-90 wt %, $SiO_2$ 0-48 wt % and (Pt+Au) 10-80 wt % also provides a satisfactory colored thin film.

The case of using Rh as a coloring agent is explained hereinafter.

The preferable composition of a colored thin film is, for example, $TiO_2$ 3-90 wt %, $SiO_2$ 0- 40 wt % and Rh 5-60 wt % (conversion value in terms of RhO).

The visible transmissive light of this colored thin film has the main wavelength in the vicinity of 575 nm of yellow, and the visible light transmittance Tv is 49-85%. The reflective light exhibits from white to yellow according as the film thickness becomes large.

Rhodium chloride used as a coloring material is hardly soluble in the coating solution used heretofore, and so it is therefore preferable to dissolve rhodium chloride in the same amount of ethanol, and then mix the resultant solution with hexylene glycol.

The coating solution thus obtained has a satisfactory preservation stability, and is usable even after preserving for 3 months at room temperature.

The case of using Ru as a coloring agent is explained hereinafter.

The preferable composition of a colored thin film is, for example, $TiO_2$ 0-80 wt %, $SiO_2$ 8-90 wt % and RuO 10-60 wt %.

The visible transmissive light of this colored thin film has the main wavelength in the vicinity of 574 nm of yellow, and the visible light transmittance Tv is 62-85%. The reflective light exhibits from white to yellow according as the film thickness becomes larger.

It is preferable to prepare a coating solution by dissolving ruthenium chloride in the same amount of ethanol and then mixing the resultant solution with hexylene glycol in a desired ratio. If the coating solution is prepared by using $HNO_3$ as a catalyst, the mixture changes chemically, and generates heat in several minutes to evolve a brown gas. This chemical change does not occur when HCl and $CH_3COOH$ are used as a catalyst, which is preferable.

The coating solution thus obtained has a satisfactory preservation stability, and is usable even after preserving for 3 months at room temperature.

As shown in FIG. 2, a thin film 2 produced by the present invention has various uses.

Figure 2A:
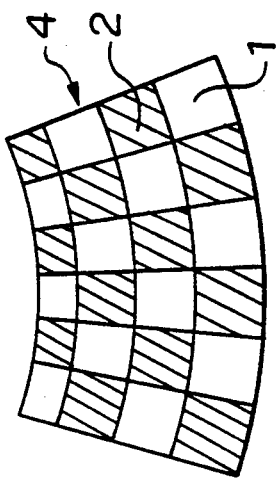
FIGS. 2(a)-2(d), 3(a)-3(d), 4(a)-4(b) and 5 are plan views illustrating Examples of colored thin films formed on window glasses in accordance with the present invention.
Figure 2C:
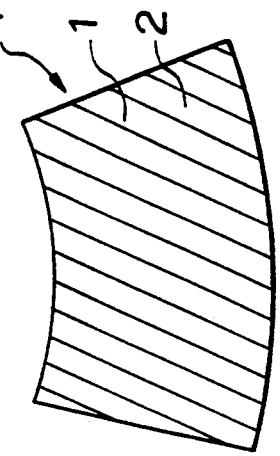
Figure 2B:
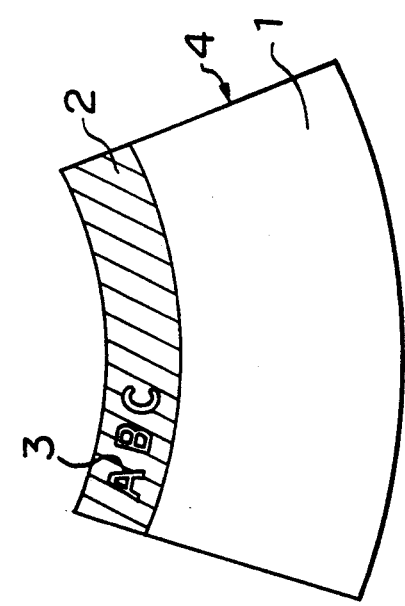
Figure 2D:
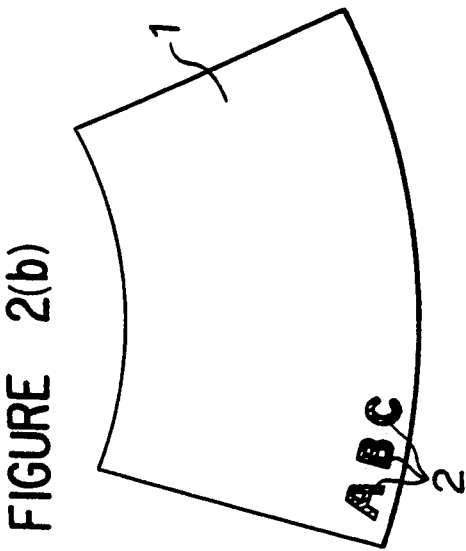
Figure 3A:
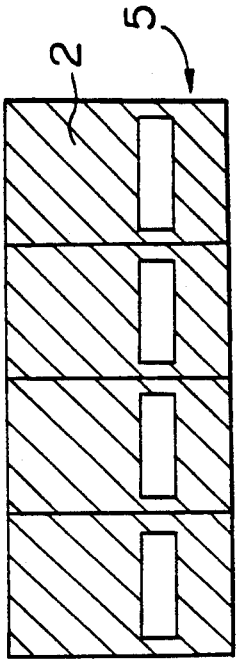
Figure 3B:
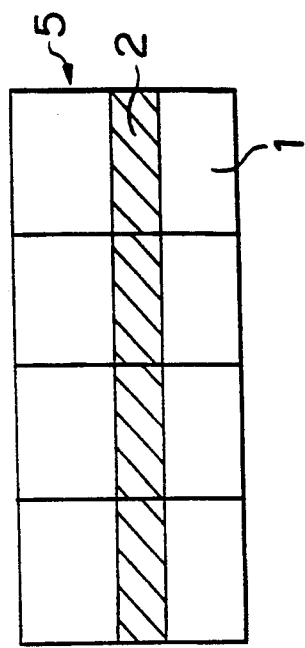
Figure 3C:
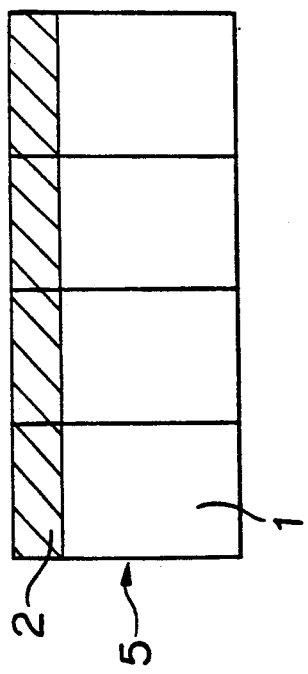
Figure 3D:
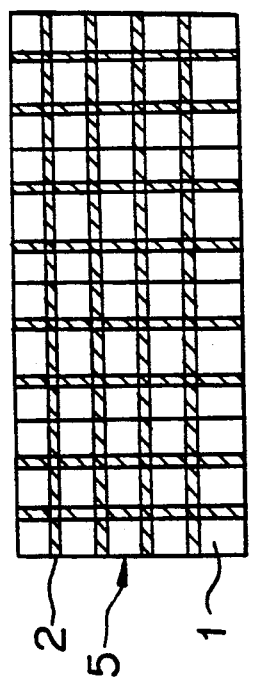

For example, it can be use as a shade band of a window glass for an automobile as shown in FIG. 2(a), and openwork letters 3 and other decorative patterns can be formed on the window glass. Further, as shown in FIG. 2(b), colored decorative letters and patterns, for example, those having a visible light transmittance of at least 70% can be formed on the window glass. Still further, as shown in FIG. 2(c), colored decorative patterns, for example, those having a visible light transmittance of at least 70% can be applied on the whole surface of the window glass. Still further, as shown in FIG. 2(d), the whole surface of the window glass can be covered with a colored thin film, and openwork letters can also be applied. Thus, FIG. 2 shows a window glass 4 for an automobile, including a wind shield glass, a rear window glass and a sunroof window.

FIG. 3 shows window glasses 5 for buildings. For example, as shown in FIG. 3(a), the window glass of the present invention can be used as a window glass with a sunshade in the home. As shown in FIG. 3(b), it can be used as a partly transparent window glass. Also, as shown in FIG. 3(c), it can be used as a window glass with partly transparent and colored patterns. Further, as shown in FIG. 3(d), it can be used as a window glass with the same patterns as that of a sliding door.

Figure 4B:
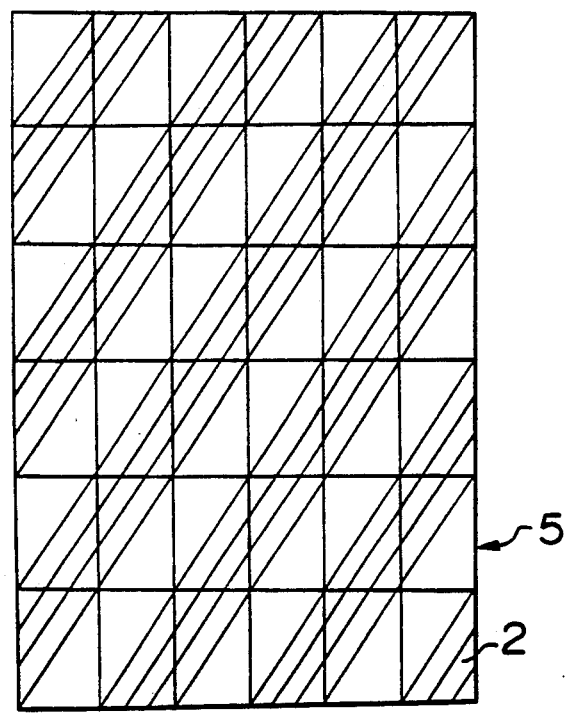
Figure 4A:
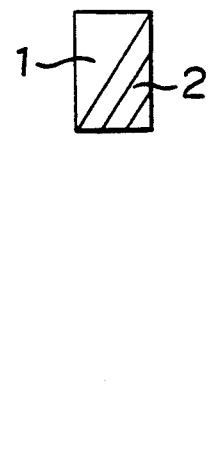

FIG. 4(b) shows a window glass 5 used as an outer wall for a building, which is prepared by combining the basic pattern as shown in FIG. 4(a).

Figure 5:
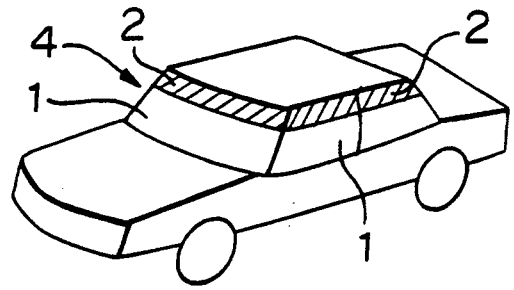

FIG. 5 illustrates an automobile with window glasses having a continuous shade band formed by the colored thin film 2 of the present invention in such manner as to surround the automobile.

The window glass 4 of the present invention can also be used as a window glass for a sunroof or for a privacy window.

Figure 14A:
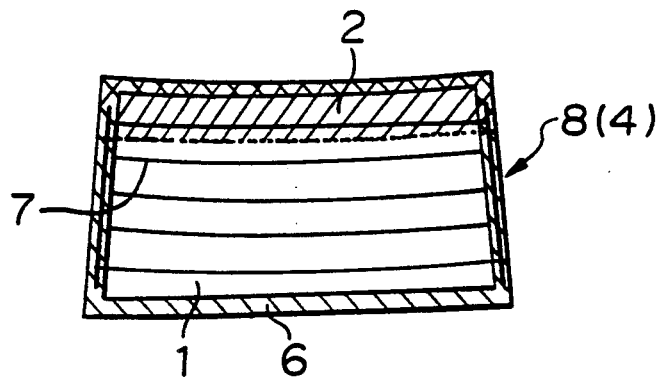
Figure 14B:
FIG. 14(b) is a partially enlarged view of FIG. 14(a).

Making the best use of one of the essential futures of the present invention, gradation patterning, that is, varying printing area per unit area without changing the thickness or the color tone of a thin film 2, can be easily made as shown in FIG. 14(b). The gradation patterning can be applied, for example, to the boundary between the sunshade part of a window and the other part, to the boundary between the peripheral part of a window and the central part of the window, to the boundary between the central pattern of a window and the other part, and to the boundary between the shade band part of an automobile window and the other part.

A window glass with a thin film of the present invention can further be coated with a ceramic color print 6 formed by coating a ceramic color ink 26 and baking it, and its typical example include a window glass 4 for an automobile.

The production steps of the automobile window glass are explained hereinafter with referring to FIG. 6.

Figures 6A, 6B, 6C:
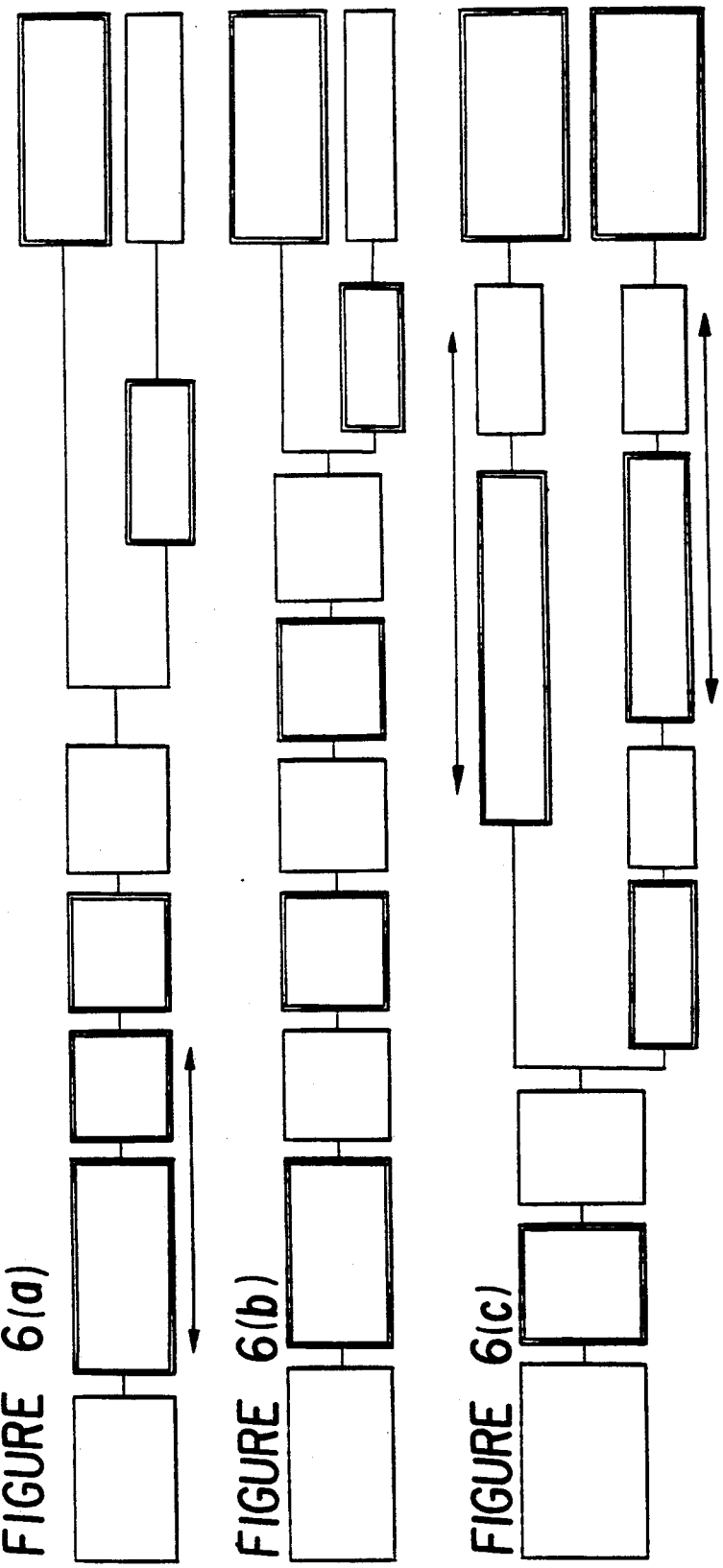
FIGS. 6(a)-6(c) are a flow diagram illustrating production steps of a window glass in accordance with the present invention.
Figure 7A:
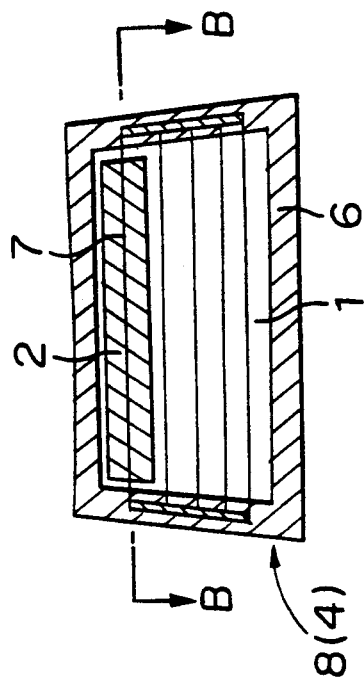
FIGS. 7(a), 8(a), 9(a), 10(a) and 11(a) are plan views illustrating Examples of window glasses of the present invention.
Figure 7B:
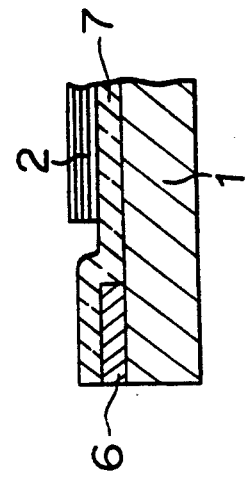
FIGS. 7(b), 8(b), 9(b), 10(b) and 11(b) are sectional views respectively of FIGS. 7(a) to 11(a).

A window glass with a thin film 2 and a ceramic color print 6 can be produced by the production lines (a), (b) or (c) as illustrated in FIG. 6.

In the case of the production line(b), a ceramic color ink 26 is printed by screen-printing and is baked (at about 600° C.) before coating a coating solution 13 by flexographic printing. The glass substrate thus treated can be transported for a long distance to another factory, and can be washed before the next step.

In the case of the production line(a), the ceramic color ink 26 is coated by screen-printing and is dried (at about 80°-200° C. for about 4-10 minutes) before coating the coating solution 13 by flexographic printing. The glass substrate thus treated is suitable for transportation within the same factory to the next step. In this case, the dried glass substrate can not be washed before the next step, but the step is simplified, which results in the production at a low cost (see the production line (a)).

In the production lines (a) and (b), if the baking of the photosensitive material layer is carried out simultaneously while the glass substrate is heated for the bending and/or tempering steps (at about 600°-670° C.), the process is simplified, which results in improvement on the productivity (Method A' or Method B').

In the above case, at least a part of the coating solution is overlaid on the ceramic color ink by flexographic printing, but when the coating solution is not overlaid on the ceramic color ink, the ceramic color ink is not necessary to be dried or baked.

In the production line (c), the coating solution 13 is coated by flexographic printing, and the ceramic color ink 26 is then printed.

The final step may be carried out by the baking step and the tempering and/or bending step separately as illustrated by Method A or Method B.

A ceramic color ink 26 preferably usable in the present invention is prepared by kneading an organic binder with a glass frit and an inorganic pigment such as CuO-$Cr_2O_3$, $TiO_2$, $Fe_2O_3$, CoO, $Cr_2O_3$ or the like to form a paste. A ceramic color print 6 is prepared by baking the ceramic color ink 26 on a glass substrate.

The window glass with the thin film of the present invention may also have electroconductive print 7 for heating (anti-fogging or ice-melting purposes) and/or electroconductive print 7 for an antenna.

FIGS. 7(a) to 11(a) are plan views illustrating a window glass 8 with electroconductive print of the present invention, and FIGS. 7(b) to 11(b) are partially enlarged sectional views respectively of FIGS. 7(a) to 11(a), wherein 1 represents a glass substrate, 6 representing a ceramic color print, 7 representing electroconductive print, and 2 representing a thin film. The production steps of the window glass with electroconductive print of the present invention are explained hereinafter with referring to FIGS. 12(a), (b) and (c).

Figure 8A:
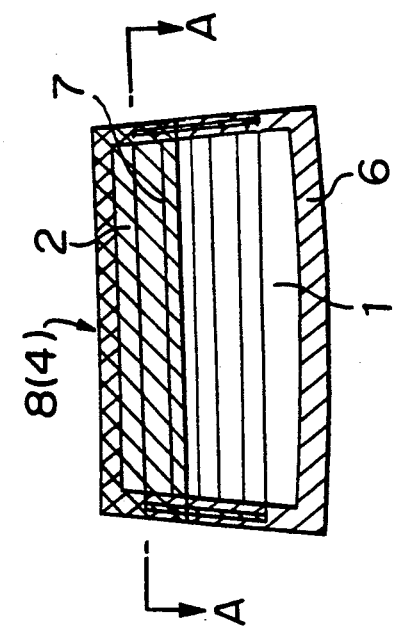
Figure 8B:
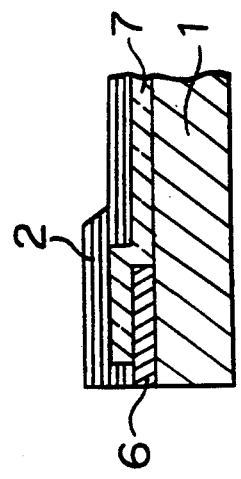
Figures 12A, 12B, 12C:
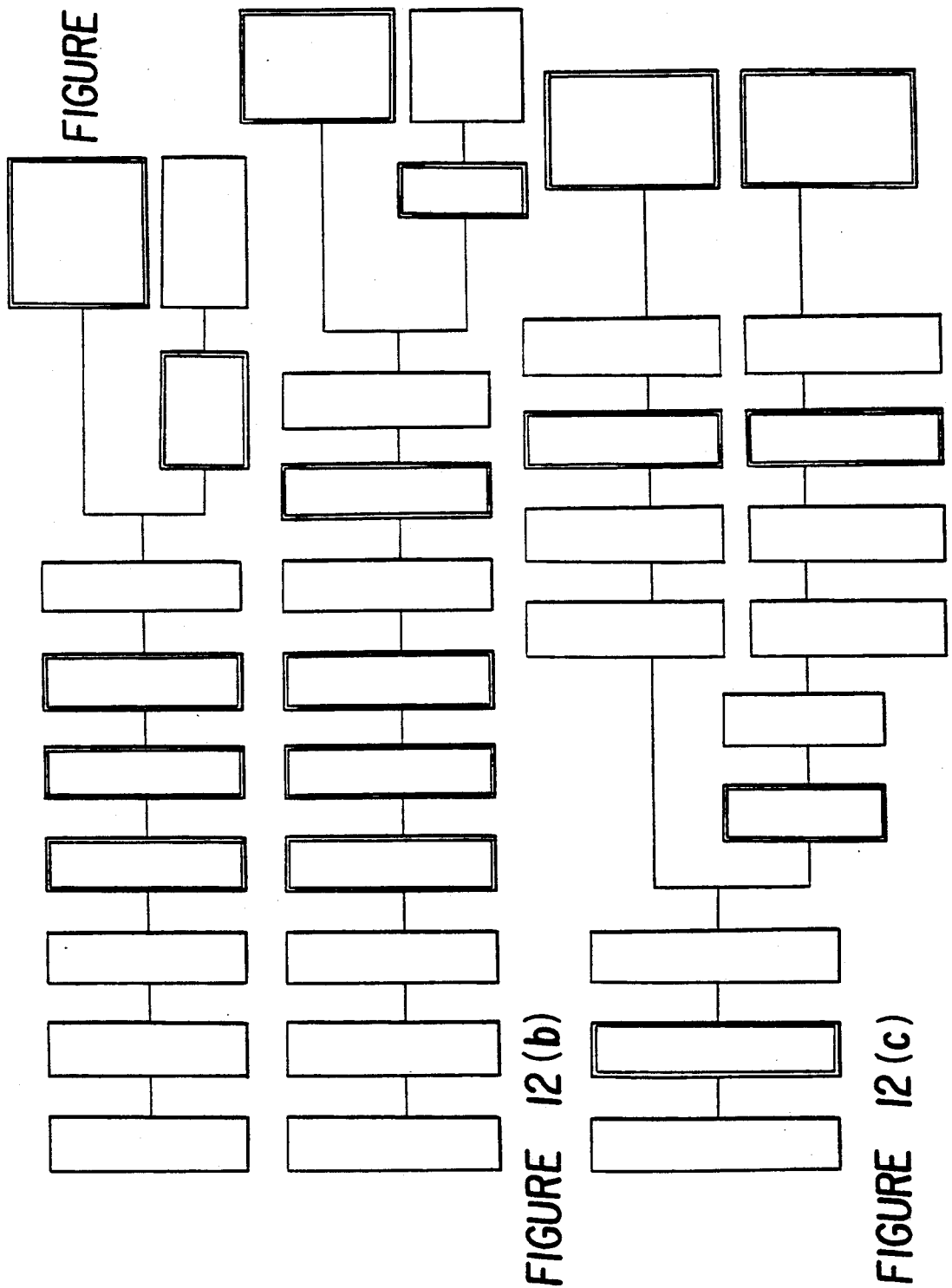
FIGS. 12(a)-12(c) are a flow diagram illustrating production steps of a window glass in accordance with the present invention.

FIG. 12(a) illustrates the production line for the glass window 8 with electroconductive print as illustrated in FIGS. 7 and 8. That is, the paste 27 for electroconductive print is coated on a glass substrate 1 by screen-printing, and is dried at 80°-200° C. for 4-20 minutes. If desired, a ceramic color ink 26 is coated by screen-printing and is dried at 80°-200° C. for 4-10 minutes before printing the paste 27 for electroconductive print. Thereafter, a coating solution 13 is coated by flexographic printing, and is baked together with the ceramic color ink 26 and the paste 27 for electroconductive print to form a thin film 2, thereby producing a window glass 8 with electroconductive print. The window glass 8 with electroconductive print thus obtained may be subjected to tempering and/or bending steps. This production line corresponds to Method A of FIG. 12(a). When a coating solution gellable by light is used, the flexographically printed layer is preferably exposed to light and/or dried before it is baked, so as not to be adhesive to dusts. The baking of the flexographically printed layer conducted in Method A can be carried out simultaneously while the glass substrate is heated for the tempering and/or bending steps (Method A'). Thus, the production line of Method A' is simplified, and takes a lower cost. The products illustrated in FIGS. 7 and 8 can be produced also by the production line illustrated by FIG. 12(b). A ceramic color ink 26 is coated by screen-printing and dried, and a paste 27 for electroconductive print is then coated by screen-printing and dried. The glass substrate thus treated is then baked at such a temperature (about 600° C.) as not to warp the glass substrate to form the baked ceramic color print 6 and electroconductive print 7. Thereafter, the glass substrate thus obtained is washed and coated with a coating solution 13 by flexographic printing. The resultant glass substrate is baked to form a thin film 2, thus producing a window glass 8 with electroconductive print. This production line (FIG. 12(b), Method B) is substantially the same as Method A of FIG. 12(a) other than these steps.

In the same manner as in Method A' of FIG. 12(a), the baking of the flexographically printed layer can be carried out simultaneously while the glass substrate is heated for the tempering and/or bending steps (FIG. 12(b), Method B').

Figure 9A:
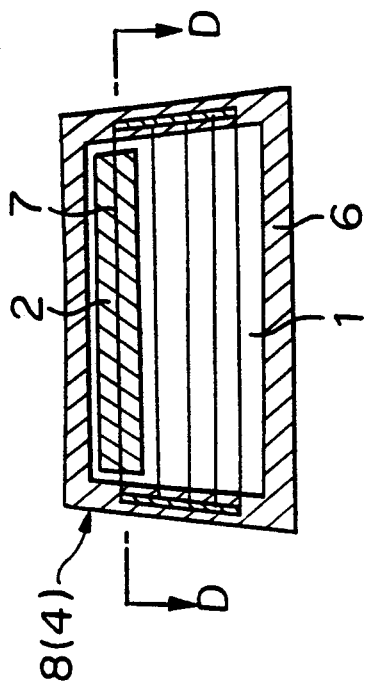
Figure 9B:
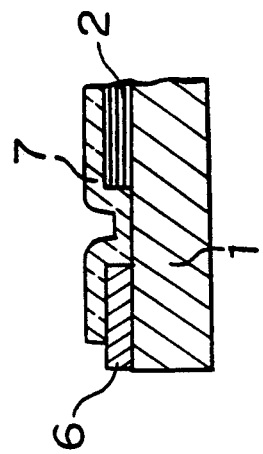
Figure 10A:
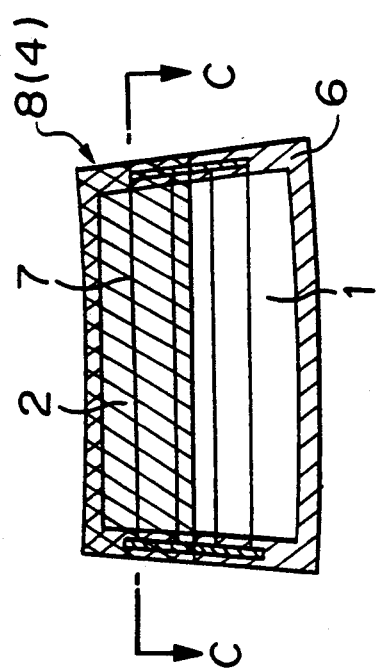
Figure 10B:
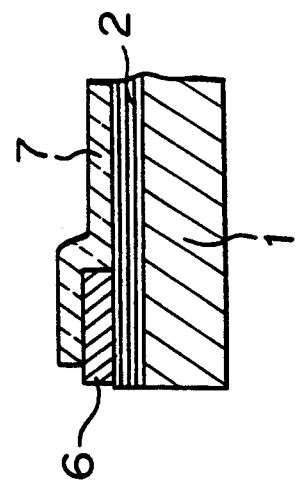

The products illustrated in FIGS. 9 and 10 can be produced by the production steps wherein a thin film 2 is previously formed, and a ceramic color print 6 and electroconductive print 7 are then formed to produce a window glass 8 with electroconductive print. This production line is illustrated by FIG. 12(c). In the same manner as in Method A of FIG. 12(a) and Method B of FIG. 12(b), the baking may be carried out separately from the tempering and/or bending steps.

Figure 11A:
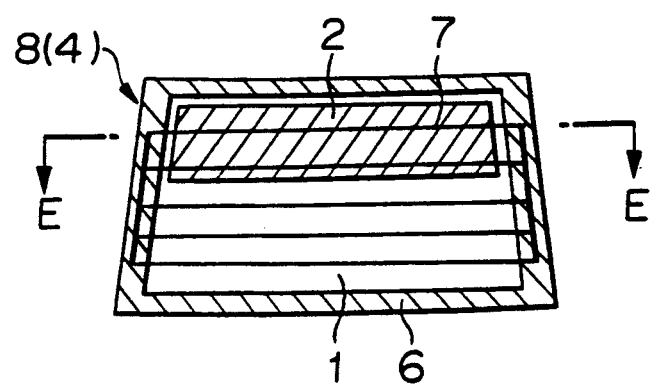
Figure 11B:
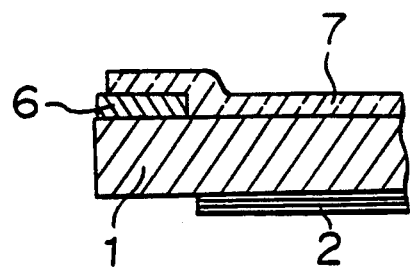

According to Method B, B' and C of FIG. 12, a thin film 2 can be formed on the opposite side of the glass substrate on which a ceramic color print 6 and electroconductive print 7 are formed, as shown in FIGS. 11(a) and 11(b).

Figure 13:
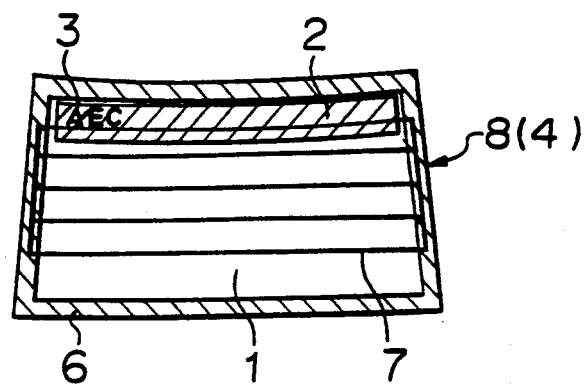
FIGS. 13 and 14(a) are plan views illustrating other Examples of window glasses produced in accordance with the present invention.

As mentioned above, according to the present invention, patterning can be easily conducted, and it is therefore possible to make the design of openwork letters 3 as illustrated in FIG. 13, and to form gradation on the boundary of the end part of the colored thin film 2 by gradually reducing the area of the colored thin film per unit area of the glass substrate on the boundary as shown in FIG. 14(b).

Now, the present invention will be described in further detail with reference to Examples. However, it should be understood that the present invention is by no means restricted to such specific Examples.

EXAMPLE 1

A coating solution having the following composition was used.

|  | Parts by weight |
| --- | --- |
| Titanium tetrapropoxide (Tetraisopropyl titanate) | 30.4 |
| Ethyl silicate (tetramer) | 14.2 |
| Acetyl acetone | 8.0 |
| Hydrochloric acid | 60.0 |
| Hexylene glycol | 379 |
| Paradium chloride ($PdCl_2$) | 31.0 |

The above solution was applied on a glass substrate (2 mm in thickness × 180 mm × 120 mm, visible light transmittance=95%, hereinafter, the same glass substrates were used in the following Examples) by flexographic printing to form a printed layer, and was exposed for one minute in air to light from a mercury lamp (H Bulb manufactured by U.S. Fusion Co.) positioned at a height of 65 to 150 mm from the printed film. The glass substrate thus treated was baked for 9 minutes in an oven maintained at 610° C. The colored thin film thus obtained had the following optical properties.
Visible light transmittance:59.3%
Main wavelength:576.9 nm
Color purity:15.9%
Visible light reflectance:30.9%
Main wavelength:580.5 nm
Color purity:13.3%

EXAMPLE 2

A coating solution having the following composition was used.

|  | Parts by weight |
| --- | --- |
| Titanium tetrapropoxide | 64.6 |
| Ethyl silicate (tetramer) | 30.26 |
| Acetyl acetone | 34.0 |
| Hydrochloric acid | 64.1 |
| Hexylene glycol | 436 |
| Chloroauric acid ($HAuCl_4.4H_2O$) | 11.1 |

The above solution was applied on a glass substrate by flexographic printing in the same manner as in Example 1 to form a printed layer, and was exposed to light and baked in the same manner as in Example 1 to obtain a colored thin film having the following optical properties.
Visible light transmittance:72.0%
Main wavelength:484.1 nm
Color purity:2.6%
Visible light reflectance:16.1%
Main wavelength:446.2 nm
Color purity:3.0%

EXAMPLE 3

A coating solution having the following composition was used.

|  | Parts by weight |
| --- | --- |
| Titanium tetrapropoxide | 51.9 |
| Tetraethoxy zirconium | 32.2 |
| Acetyl acetone | 32.0 |
| Hydrochloric acid | 60.1 |
| Hexylene glycol | 404.1 |

-continued

|  | Parts by weight |
|---|---|
| Chloroauric acid (HAuCl$_4$.4H$_2$O) | 13.35 |

The above solution was applied on a glass substrate by flexographic printing in the same manner as in Example 1 to form a printed layer, and was exposed to light and baked in the same manner as in Example 1 to obtain a colored thin film having the following optical properties.
 Visible light transmittance:66.5%
 Main wavelength:490.2 nm
 Color purity:3.3%
 Visible light reflectance:19.4%
 Main wavelength:451.1 nm
 Color purity:7.0%

EXAMPLE 4

A coating solution having the following composition was used.

|  | Parts by weight |
|---|---|
| Titanium tetrapropoxide | 12.66 |
| Ethyl silicate (tetramer) | 35.6 |
| Acetyl acetone | 25.0 |
| Hydrochloric acid | 75.0 |
| Hexylene glycol | 295.3 |
| Paradium chloride (PdC2) | 12.9 |
| Chloroauric acid (HAuCl$_4$.4H$_2$O) | 18.5 |

The above solution was applied on a glass substrate by flexographic printing in the same manner as in Example 1 to form a printed layer, and was exposed to light and baked in the same manner as in Example 1 to obtain a colored thin film having the following optical properties.
 Visible light transmittance:51.2%
 Main wavelength:577.2 nm
 Color purity:6.0%
 Visible light reflectance:25.9%
 Main wavelength:569.1 nm
 Color purity:4.0%

EXAMPLE 5

A coating solution having the following composition was used.

|  | Parts by weight |
|---|---|
| Titanium tetrapropoxide | 12.7 |
| Ethyl silicate (tetramer) | 105.6 |
| Acetyl acetone | 40.0 |
| Hydrochloric acid | 20.0 |
| Hexylene glycol | 717 |
| Hexachloroplatinic acid (H$_2$PtCl$_6$.6H$_2$O) | 94.4 |

The above solution was applied on a glass substrate by flexographic printing in the same manner as in Example 1 to form a printed was exposed to light and baked in the same manner as in Example 1 to obtain a colored thin film having the following optical properties.
 Visible light transmittance:80.1%
 Main wavelength:574.5 nm
 Color purity:3.0%
 Visible light reflectance:11.7%
 Main wavelength:495.7 nm
 Color purity:2.1%

EXAMPLE 6

A coating solution having the following composition was used.

|  | Parts by weight |
|---|---|
| Titanium tetrapropoxide | 50.6 |
| Acetyl acetone | 18.0 |
| Hydrochloric acid | 50.0 |
| Hexylene glycol | 427 |
| Rhodium Chloride (RhCl$_3$.3H$_2$O) | 47.3 |
| Ethanol | 47.3 |

The above solution was applied on a glass substrate by flexographic printing in the same manner as in Example 1 to form a printed layer, and was exposed to light and baked in the same manner as in Example 1 to obtain a colored thin film having the following optical properties.
 Visible light transmittance:49.5%
 Main wavelength:575.0 nm
 Color purity:12.3%
 Visible light reflectance:28.1%
 Main wavelength:577.5 nm
 Color purity:16.7%

EXAMPLE 7

A coating solution having the following composition was used.

|  | Parts by weight |
|---|---|
| Titanium tetrapropoxide | 38 |
| Ethyl silicate (tetramer) | 17.8 |
| Acetyl acetone | 33.4 |
| Hydrochloric acid | 33.4 |
| Hexylene glycol | 566.8 |
| Ruthenium Chloride (RuCl$_3$.3H$_2$O) | 39.4 |
| Ethanol | 39.4 |

The above solution was applied on a glass substrate by flexographic printing in the same manner as in Example 1 to form a printed layer, and was exposed to light and baked in the same manner as in Example 1 to obtain a colored thin film having the following optical properties.
 Visible light transmittance:72.5%
 Main wavelength:574.0 nm
 Color purity:5.2%
 Visible light reflectance:12.2%
 Main wavelength:480.8 nm
 Color purity:10.0%

EXAMPLE 8

A coating solution having the following composition was used.

|  | Parts by weight |
|---|---|
| Titanium tetrapropoxide | 36.1 |
| Ethyl silicate (tetramer) | 1.34 |
| Acetyl acetone | 21 |
| Hydrochloric acid | 61 |
| Hexylene glycol | 358.6 |
| Water | 30 |
| Fluorine type surfactant | 8.2 |
| Hexachloroplatinic acid (H$_2$PtCl$_6$.6H$_2$O) | 66.1 |

The above solution was applied on a glass substrate by flexographic printing in the same manner as in Example 1 to form a printed layer, and was exposed to light and baked in the same manner as in Example 1 to obtain a colored thin film having the following properties.

Visible light transmittance:38.1%
Main wavelength:579.4 nm
Color purity:8.9%
Visible light reflectance:31.6%
Main wavelength:536.9 nm
Color purity:1.1%

EXAMPLE 9

A coating solution having the following composition was used.

|  | Parts by weight |
| --- | --- |
| Titanium tetrapropoxide | 37.8 |
| Ethyl silicate (tetramer) | 0.89 |
| Acetyl acetone | 10 |
| Hydrochloric acid | 50 |
| Hexylene glycol | 321.6 |
| Phosphoric acid | 1.1 |
| Chloroauric acid ($HAuCl_4 \cdot 4H_2O$) | 37.8 |
| Hexachloroplatinic acid ($H_2PtCl_6 \cdot 6H_2O$) | 29.7 |

The above solution was applied on a glass substrate by flexographic printing in the same manner as in Example 1 to form a printed layer, and was exposed to light and baked in the same manner as in Example 1 to obtain a colored thin film having the following properties.

Visible light transmittance:39.3%
Main wavelength:571.6 nm
Color purity:1.6%
Visible light reflectance:20.6%
Main wavelength:578.1 nm
Color purity:7.2%

The colored thin films obtained in the above Examples 1 to 9 were uniformly and firmly adhered on the glass substrates, and had high durability and high wear resistance.

EXAMPLE 10

A gray float glass of 4 mm thickness having a visible light transmittance of 76% was used as a glass substrate. After washing the glass substrate, the following coating solution was applied on the washed glass substrate by flexographic printing to form a printed layer, and was exposed to UV light from a mercury lamp placed above said printed layer. The glass substrate thus treated was baked in an oven maintained at 630° C. by passing therethrough for 6 minutes. The resultant glass substrate was coated with a ceramic color ink by screen-printing and was dried.

Thereafter, the glass substrate thus treated was heated to 600° C. and was cooled by air for tempering.

The photosensitive mixture used herein had the following composition.

|  | Parts by weight |
| --- | --- |
| Titanium tetrapropoxide | 38.0 |
| Acetyl acetone | 12 |
| Hydrochloric acid | 72 |
| Hexylene glycol | 356 |
| Paradium chloride ($PdCl_2$) | 36.1 |

| | Parts by weight |
| --- | --- |
| $H_3PO_4$ | 0.1 |

The colored thin film part thus obtained was yellow and had the following optical properties.

Visible light transmittance:42.7%
Main wavelength:588.2 nm
Color purity:20.2%
Visible light reflectance*:24.9%
Main wavelength*:568.1 nm
Color purity*:6.7%

*The measurement was conducted from the opposite side of the colored thin film side.

The colored thin film and the ceramic color print thus obtained were firmly baked on the glass substrate with a high adhesive force, and had excellent abrasion resistance and peeling resistance.

EXAMPLE 11

Figure 15A:
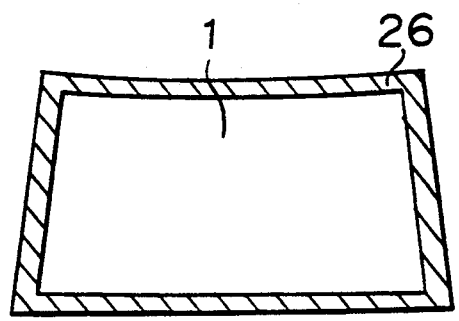
FIGS. 15(a)-15(c) are a flow diagram illustrating Example 11.
Figure 15B:
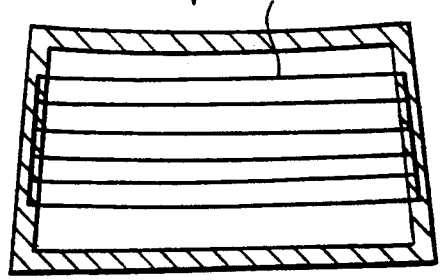
Figure 15C:
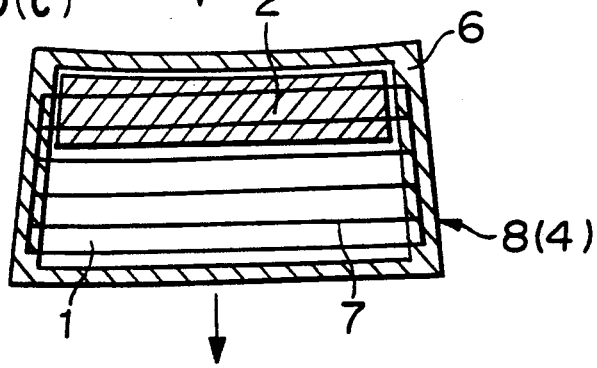
Figure 16A:
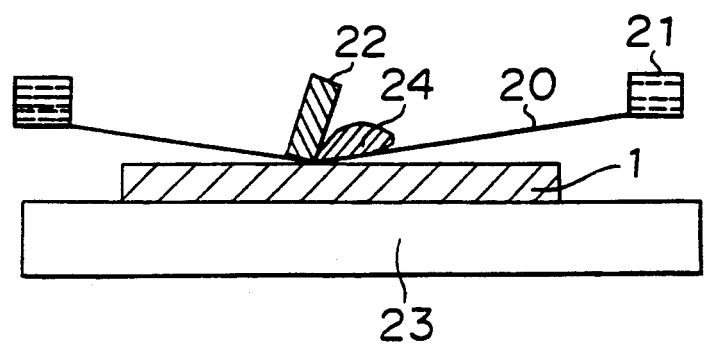
FIGS. 16(a) and 16(b) are sectional views illustrating screen-printing.
Figure 16B:
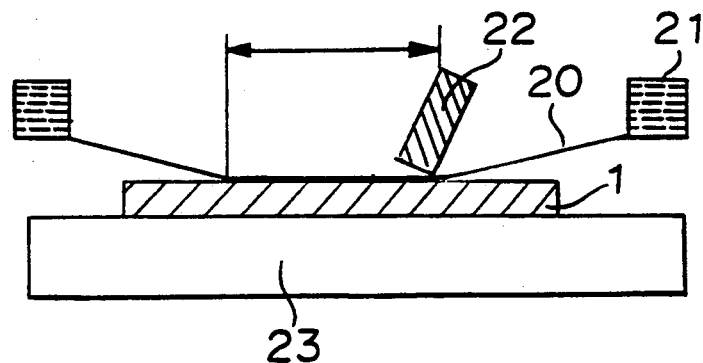
Figure 11A:
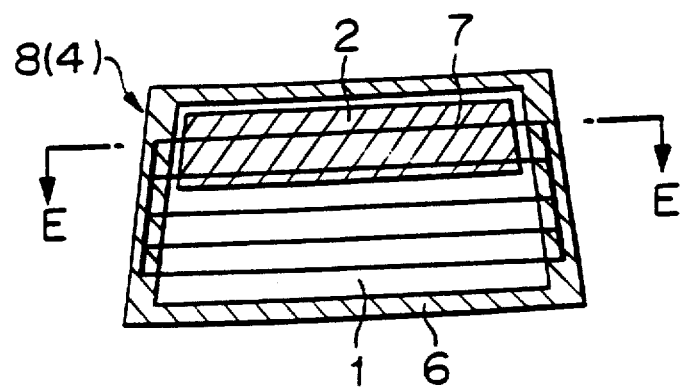
Figure 11B:
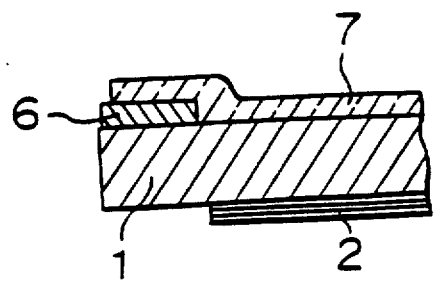
Figure 11A:
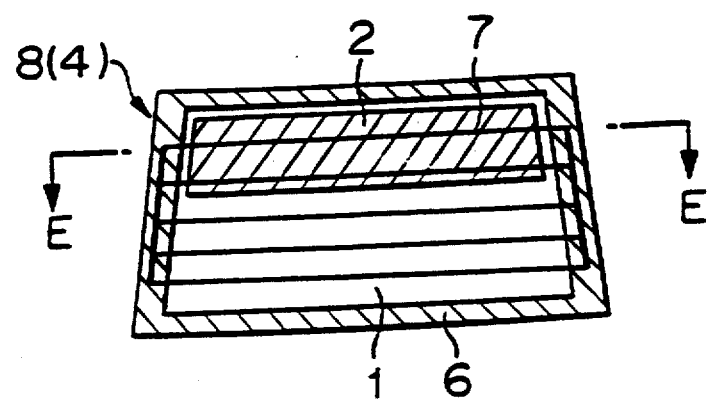
Figure 11B:
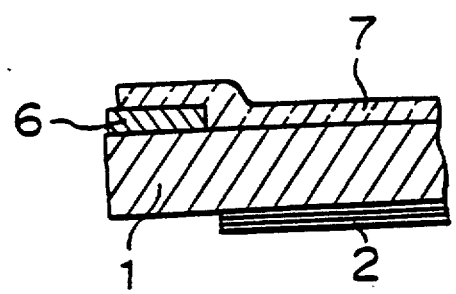

As shown in FIG. 15 (a), a gray glass substrate 1 having a thickness of 4 mm (visible light transmittance=76%) was cut and chamfered, and was printed with a ceramic color ink 26 by screen printing and dried at 120° C. for 10 minutes. As shown in FIG. 15 (b), the glass substrate thus treated was further printed with a paste 27 for electroconductive print and dried at 120° C. for 10 minutes.

The coating solution used herein had the following composition.

|  | Parts by weight |
| --- | --- |
| Titanium tetrapropoxide | 36.09 |
| Ethyl silicate (tetramer) | 1.34 |
| Acetyl acetone | 21 |
| Hydrochloric acid | 61 |
| Hexylene glycol | 332.4 |
| Hexachloroplatinic acid ($H_2PtCl_6 \cdot 6H_2O$) | 66.72 |
| Water | 30 |
| Fluorine type surfactant | 0.8 |

As shown in FIG. 15 (c), the above coating solution was printed by flexographic printing to form a printed layer 2 on the side of the glass substrate where the paste 27 for electroconductive print was printed, and was exposed to light in air by irradiating ultraviolet ray from a mercury lamp positioned above the printed layer for one minutes. The glass substrate thus treated was dried in an oven at 120° C. for 10 minutes, and was heated to 650° C. and was bent and cooled by air for tempering the glass substrate, to form a colored thin film 2 covering electroconductive print 7, thus producing a window glass 8 with electroconductive print 7 as shown in FIG. 8.

The colored thin film 2 part had the following optical properties.

Visible light transmittance:30.1%
Main wavelength:581 nm
Color purity:9.4% (bronze color)
Visible light reflectance*:18.8%
Main wavelength*:577.7 nm
Color purity*:2.8% (bronzed white)

*The measurement was conducted from the opposite side of the colored thin film side.

The electroconductive wire 7, the ceramic color print 6 and the colored thin film 2 were firmly adhered to the glass substrate 1, and had a high durability.

EXAMPLE 12

A product as shown in FIG. 9 was produced. First, a gray glass substrate 1 having a thickness of 4 mm (visible light transmittance=76%) was cut, chamfered and washed, and was printed with the following coating solution by flexographic printing. The glass substrate thus treated was exposed to light and baked. The glass substrate was then washed (particularly to remove the dirty part stained during transportation), and the peripheral part of the washed glass substrate was printed with a ceramic color ink by screen-printing, and was dried. The resultant glass substrate was further printed with a paste for electroconductive print 7 by screen-printing, and was dried and baked simultaneously with bending, thus forming a colored thin film 2 with electroconductive print 7.

The coating solution used herein had the following composition.

|  | Parts by weight |
|---|---|
| Titanium tetrapropoxide | 24.06 |
| Ethyl silicate (tetramer) | 0.89 |
| Acetyl acetone | 10 |
| Hydrochloric acid | 20 |
| Hexylene glycol | 435.35 |
| Hexachloroplatinic acid ($H_2PtCl_6.6H_2O$) | 37.78 |
| Chloroauric acid ($HAuCl_4.4H_2O$) | 29.66 |
| Fluorine type surfactant | 0.47 |
| Phosphoric acid | 0.25 |

Thus, a glass with electroconductive print 7 baked on the colored thin film 2 as shown in FIG. 9 was obtained. The optical properties of the colored thin film part were as follows:

Visible light transmittance:28.3%
Main wavelength:579 nm
Color purity:7.0 (bronze color)
Visible light reflectance*:17.2%
Main wavelength*:499.7 nm
Color purity*:0.9% (bluish white)

* The measurement was conducted from the opposite side of the colored thin film side.

The colored thin film 2, the ceramic color print 6 and the electroconductive print 7 were firmly adhered to the glass substrate 1 in the same manner as in Example 11, and had a high durability.

According to the present invention, a colored thin film can be formed on a window glass by flexographic printing in a large area evenly and uniformly or optionally in patterns. The colored thin film can be directly printed without masking the glass substrate, and therefore the production line can be simplified. Thus, the present process is suitable for mass production at a low cost.

Further, in the present invention, a coating solution used for flexographic printing has a low viscosity, and accordingly leveling after coating can be rapidly carried out, thus forming an even film having a uniform film thickness.

The flexographically printed layer of a coating solution which is gellable by light becomes such a dry state as to prevent dusts from adhering thereto by exposing to light, thereby enabling a clean room smaller. Also, by exposing to light, the viscosity of the photosensitive colored thin film material layer becomes so high as not to spread to the periphery. When paradium is used as a coloring agent, color development by exposing to light becomes so good as to reduce the visible light transmittance. When gold is used as a coloring agent, the main wavelength is shifted to the shorter zone by exposing to light as compared with other coloring agents. Also, resistance to abrasion and resistance to chemicals are improved by exposing to light.

According to the present invention, a shade band on a tempered glass window for an automobile can be produced. This window can be used in place of a laminated glass with a partly colored (shade band) plastic interlayer used heretofore. Particularly, flexographic printing enables the forming of a colored thin film on only a part of a glass substrate at a low cost.

Unlike the shade band of the intermediate film of the laminated glass, the shade band formed on the tempered glass in accordance with the present invention has high visible reflectance, and therefore provides an improved existence and a different quantity impression.

According to the present invention, since patterns can be easily formed, such marks, letters and the like as to stress the identity of an automobile can be easily applied at the same time. Also, a favorite color can be easily selected among various colors such as gray, bronze, blue, yellow, and intermediate colors thereof.

The present invention can be applied not only to shade bands for automobiles but also to privacy windows, roofs, window glasses and the like.

The electroconductive print used in the present invention include resistant print to heat for defogging, electroconductive print for antennas and the like.

According to the present invention, electroconductive print, ceramic color prints and colored thin films are baked on glass substrates, and therefore they are firmly adhered to the glass substrates without causing any peeling off problems.

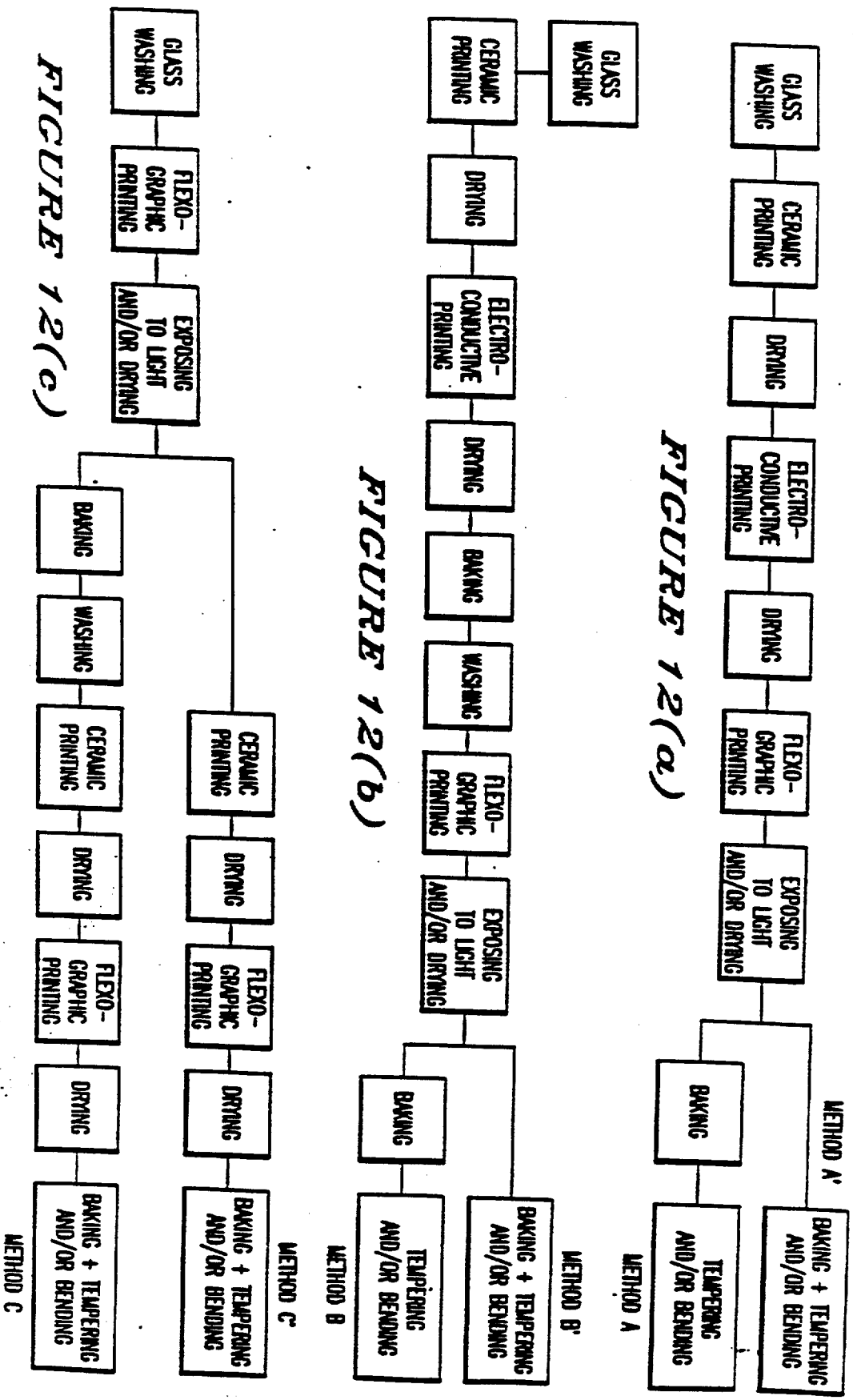

What is claimed is:

1. A process for producing a window glass with a thin film thereon, which comprises coating a coating solution which can be gelled by light on a glass substrate by flexographic printing, then exposing the coated glass substrate to light, and then baking the coated glass substrate to form a thin film.

2. The process according to claim 1, wherein the coating solution which can be gelled by light contains a chelating agent and a metal alkoxide which can be gelled by light in the presence of the chelating agent.

3. The process according to claim 2, wherein the chelating agent is acetyl acetone.

4. The process according to claim 2, wherein the metal alkoxide is at least one alkoxide selected from the group consisting of a titanium alkoxide, an indium alkoxide, a silicon alkoxide, a zirconium alkoxide, a boron alkoxide, a tantalum alkoxide, and a tin alkoxide.

5. The process according to claim 1, wherein a coating solution containing a coloring agent is used to form a colored thin film.

6. The process according to claim 5, wherein the coloring agent is at least one member selected from the group consisting of Pd, Au, Pt, Rh, Ru, Ni, Co, Fe and a compound thereof.

7. The process according to claim 1, wherein the coating solution is coated in patterns by flexographic printing to form a thin film having patterns.

8. The process according to claim 1, wherein the coating solution is coated by flexographic printing, and is partially exposed to light, developed and baked to form a thin film having patterns.

9. The process according to claim 1, wherein a ceramic color ink is printed on a glass substrate and dried before coating the coating solution by flexographic printing.

10. The process according to claim 9, wherein the printed ceramic color ink and the flexographically printed coating are baked at the same time.

11. The process according to claim 10, wherein the baking is carried out simultaneously while the glass substrate is heated for bending and/or tempering steps.

12. The process according to claim 1, wherein a ceramic color ink is printed after coating the coating solution by flexographic printing, and the flexographically printed coating and the printed ceramic color ink are baked at the same time.

13. The process according to claim 12, wherein the baking is carried out simultaneously while the glass substrate is heated for bending and/or tempering steps.

14. The process according to claim 1, wherein a paste for electroconductive print containing metal powder and glass frit is printed on the glass substrate and dried before coating the coating solution by flexographic printing.

15. The process according to claim 14, wherein a ceramic color ink is printed on the glass substrate and dried before printing the paste for electroconductive print.

16. The process according to claim 14, wherein the baking of the flexographically printed coating is carried out simultaneously while the glass substrate is heated for bending and/or tempering steps.

17. The process according to claim 1, wherein after coating the coating solution on the glass substrate by flexographic printing, a paste for electroconductive print containing metal powder and glass frit is printed and baked.

18. The process according to claim 17 wherein after coating the coating solution on the glass substrate by flexographic printing, a ceramic color ink is printed and dried, and a paste for electroconductive print is then printed.

19. The process according to claim 17, wherein the baking of the printed paste for electroconductive print is carried out simultaneously while the glass substrate is heated for bending and/or tempering steps.

* * * * *

UNITED STATES PATENT AND TRADEMARK OFFICE
CERTIFICATE OF CORRECTION

PATENT NO. : 5,189,952

DATED : March 2, 1993

INVENTOR(S) : Shinya Ohmura, et. al.

It is certified that error appears in the above-identified patent and that said Letters Patent is hereby corrected as shown below:

Figs. 11 and 12, should be deleted to be replaced with Figs. 11 and 12 as shown on attached sheet.

Signed and Sealed this

First Day of November, 1994

Attest:

BRUCE LEHMAN

Attesting Officer

Commissioner of Patents and Trademarks

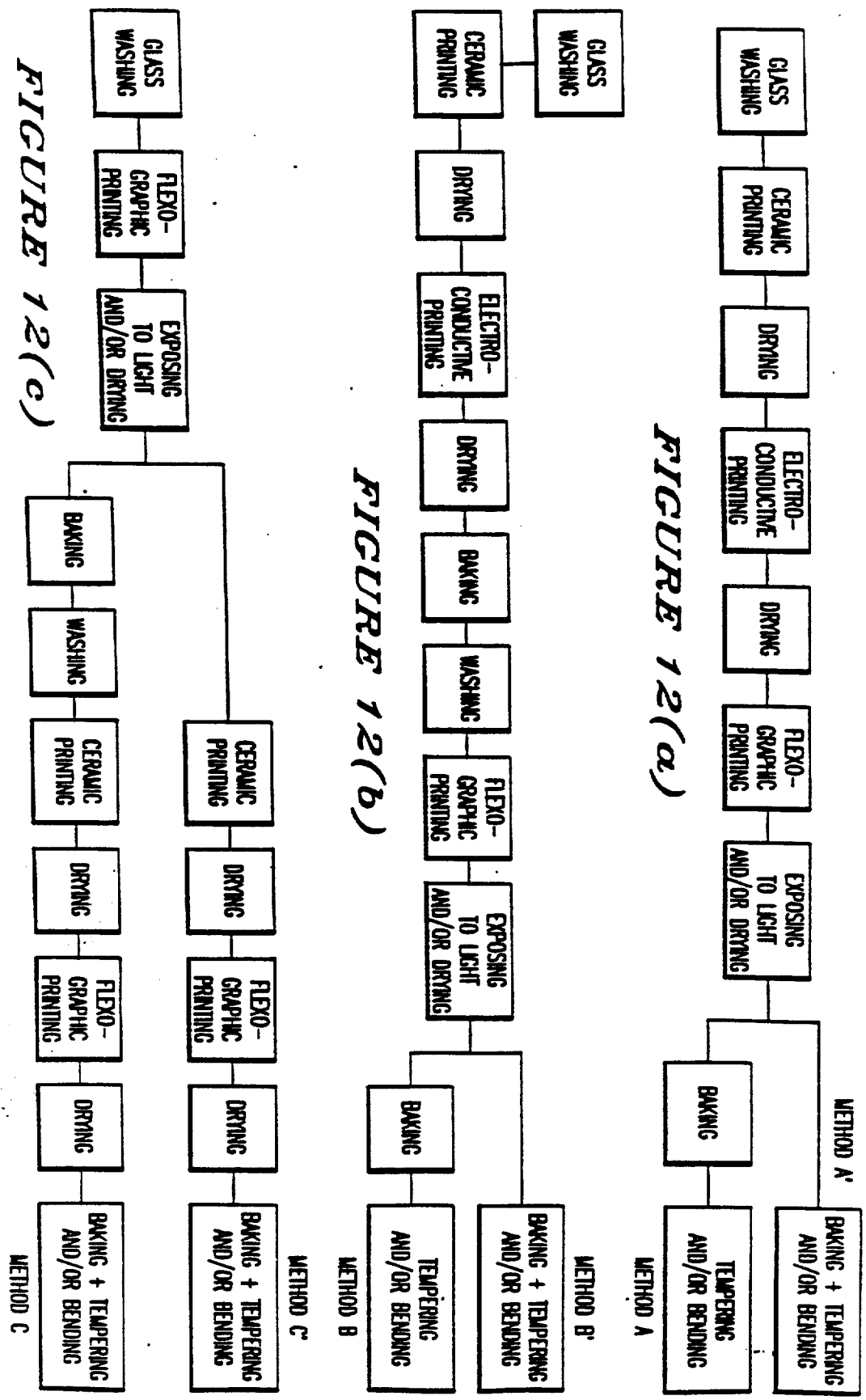

UNITED STATES PATENT AND TRADEMARK OFFICE
CERTIFICATE OF CORRECTION

PATENT NO. : 5,189,952

DATED : March 2, 1993

INVENTOR(S) : Shinya Ohmura, et al

It is certified that error appears in the above-indentified patent and that said Letters Patent is hereby corrected as shown below:

IN THE DRAWINGS

Sheets 11 and 12 should be deleted, to be replaced with attached sheets 11 and 12.

This certificate supersedes Certificate of Correction issued November 1, 1994.

Signed and Sealed this

Twenty-first Day of March, 1995

Attest:

BRUCE LEHMAN

Attesting Officer     Commissioner of Patents and Trademarks